United States Patent
Lee et al.

(10) Patent No.: US 9,582,461 B2
(45) Date of Patent: Feb. 28, 2017

(54) APPARATUS FOR INCREASING SOCIAL INTERACTION OVER AN ELECTRONIC NETWORK

(71) Applicant: Social Concepts, Inc., Redwood City, CA (US)

(72) Inventors: Joseph William Lee, Los Angeles, CA (US); Peter August Grendler, San Francisco, CA (US); Michael R. Hedlund, Los Gatos, CA (US)

(73) Assignee: Social Concepts, Inc., Redwood City, CA (US)

( * ) Notice: Subject to any disclaimer, the term of this patent is extended or adjusted under 35 U.S.C. 154(b) by 0 days.

(21) Appl. No.: 14/084,145

(22) Filed: Nov. 19, 2013

(65) Prior Publication Data

US 2014/0082084 A1     Mar. 20, 2014

Related U.S. Application Data

(63) Continuation of application No. 13/431,649, filed on Mar. 27, 2012, now Pat. No. 8,626,828, which is a
(Continued)

(51) Int. Cl.
*G06F 15/173*     (2006.01)
*G06Q 30/02*     (2012.01)
(Continued)

(52) U.S. Cl.
CPC ....... *G06F 15/17306* (2013.01); *G06Q 30/02* (2013.01); *G06Q 30/0207* (2013.01);
(Continued)

(58) Field of Classification Search
CPC ............... G06Q 30/02; G06Q 30/0207; G06Q 30/0208; G06Q 30/0209; G06Q 30/0211;
(Continued)

(56) References Cited

U.S. PATENT DOCUMENTS 5,680,455 A    10/1997   Linsker
5,774,870 A    6/1998   Storey
(Continued)

OTHER PUBLICATIONS

"HTML Marquee Code." Free Webmaster Tutorials—Quackit.com. Nov. 2005. Web Jan. 10, 2012 <http://web.archive.org/web/20061108085214/http://quackit.com/html/codes/html_marquee_code.cfm>; 5 pages.

(Continued)

*Primary Examiner* — Catherine Thiaw
(74) *Attorney, Agent, or Firm* — Schwabe Williamson & Wyatt, PC (57) ABSTRACT

In an example, an electronic device is configured to: associate a set of member actions of an electronic social networking system with an account corresponding to a member of the electronic social networking system; wherein a subset of the associated set of member actions includes member actions to be unlocked; increment a score for the account in response to the member a member-to-member interaction through the electronic social networking system; wherein the electronic social networking system comprises a social networking resource that is configured to provide real time interaction between the member and other members; gradually unlock, for the account, the member actions of the subset based on the score, wherein a first member action of the subset is unlocked in response to the score reaching a first threshold and a second different member action of the subset is unlocked in response to the score reaching a second different threshold.

10 Claims, 9 Drawing Sheets

Related U.S. Application Data continuation of application No. 11/627,336, filed on Jan. 25, 2007, now Pat. No. 8,166,407.

(51) Int. Cl.
*H04L 29/08* (2006.01)
*G06Q 10/10* (2012.01)

(52) U.S. Cl.
CPC ..... *G06Q 30/0208* (2013.01); *G06Q 30/0209* (2013.01); *G06Q 30/0211* (2013.01); *G06Q 30/0212* (2013.01); *G06Q 30/0213* (2013.01); *G06Q 30/0214* (2013.01); *H04L 29/08072* (2013.01); *G06Q 10/10* (2013.01)

(58) Field of Classification Search
CPC ........... G06Q 30/0212; G06Q 30/0213; G06Q 30/0214; G06Q 10/10; G06F 15/17306; H04L 29/08072
See application file for complete search history.

(56) References Cited

U.S. PATENT DOCUMENTS

| | | | |
|---|---|---|---|
| 5,826,244 A | 10/1998 | Huberman | |
| 5,831,590 A | 11/1998 | Ikedo | |
| 6,064,978 A | 5/2000 | Gardner | |
| 6,252,588 B1 | 6/2001 | Dawson | |
| 6,263,381 B1 | 7/2001 | Freadman | |
| 6,515,681 B1 | 2/2003 | Knight | |
| 6,571,279 B1 | 5/2003 | Herz | |
| 6,661,438 B1 | 12/2003 | Shiraishi | |
| 6,779,178 B1 | 8/2004 | Lloyd | |
| 6,793,128 B2 | 9/2004 | Huffman | |
| 6,898,631 B1 | 5/2005 | Kraft | |
| 6,901,151 B1 | 5/2005 | Rosenbaum | |
| 6,983,309 B1 | 1/2006 | Yoshizawa | |
| 6,985,248 B2 | 1/2006 | Parulski | |
| 7,020,650 B2 | 3/2006 | Sato | |
| 7,023,979 B1 | 4/2006 | Wu | |
| 7,034,871 B2 | 4/2006 | Parulski | |
| 7,037,195 B2 | 5/2006 | Schneider | |
| 7,111,317 B1 | 9/2006 | McIntyre | |
| 7,117,370 B2 | 10/2006 | Khan | |
| 7,158,945 B1 | 1/2007 | Wolcott | |
| 7,174,312 B2 | 2/2007 | Harper | |
| 7,177,044 B2 | 2/2007 | Tachiyama | |
| 7,194,253 B2 | 3/2007 | Ritter | |
| 7,240,022 B1 | 7/2007 | Bistriceanu | |
| 7,289,110 B2 | 10/2007 | Hansson | |
| 7,308,277 B2 | 12/2007 | Yomoda | |
| 7,312,827 B2 | 12/2007 | Cazier | |
| 7,464,137 B2 | 12/2008 | Zhu | |
| 7,523,385 B2 | 4/2009 | Nguyen | |
| 7,530,021 B2 | 5/2009 | Cheng | |
| 7,627,311 B2 | 12/2009 | Öijer | |
| 7,653,648 B2 | 1/2010 | Pacholec | |
| 7,660,854 B2 | 2/2010 | Sorotzkin | |
| 7,740,538 B2 | 6/2010 | Nguyen | |
| 7,788,387 B2 | 8/2010 | Kumar | |
| 7,797,529 B2 | 9/2010 | Jiang | |
| 7,813,822 B1 | 10/2010 | Hoffberg | |
| 7,822,631 B1 * | 10/2010 | Vander Mey | G06F 17/30038 |
| | | | 705/7.29 |
| 7,827,208 B2 | 11/2010 | Bosworth | |
| 7,920,626 B2 | 4/2011 | Fernandez | |
| 7,945,653 B2 | 5/2011 | Zuckerberg | |
| 8,014,763 B2 | 9/2011 | Hymes | |
| 8,022,926 B2 | 9/2011 | Arai | |
| 8,127,009 B2 | 2/2012 | Pinder | |
| 8,135,800 B1 * | 3/2012 | Walsh | G06F 17/30702 |
| | | | 707/723 |
| 8,166,407 B2 | 4/2012 | Lee | |
| 8,180,852 B2 | 5/2012 | Lee | |
| 8,190,681 B2 | 5/2012 | Markus | |
| 8,200,808 B2 | 6/2012 | Ishida | |
| 8,413,059 B2 | 4/2013 | Lee | |
| 8,549,076 B2 * | 10/2013 | Mizrahi | A63F 13/10 |
| | | | 709/205 |
| 8,600,830 B2 | 12/2013 | Hoffberg | |
| 8,601,062 B2 | 12/2013 | Buchheit | |
| 9,020,965 B1 * | 4/2015 | Sehrer | G06Q 50/01 |
| | | | 707/758 |
| 2001/0019359 A1 | 9/2001 | Parulski | |
| 2001/0028467 A1 | 10/2001 | Ishihara | |
| 2002/0049632 A1 | 4/2002 | Parkinson | |
| 2002/0070945 A1 | 6/2002 | Kage | |
| 2002/0116266 A1 | 8/2002 | Marshall | |
| 2002/0116508 A1 | 8/2002 | Khan | |
| 2002/0133637 A1 | 9/2002 | Popp | |
| 2002/0191223 A1 | 12/2002 | Ishikawa | |
| 2003/0005058 A1 | 1/2003 | Sorotzkin | |
| 2003/0063913 A1 | 4/2003 | Yamazaki | |
| 2003/0100360 A1 | 5/2003 | Manfredi | |
| 2003/0105820 A1 | 6/2003 | Haims | |
| 2003/0125080 A1 | 7/2003 | Shimamura | |
| 2003/0125107 A1 | 7/2003 | Cannon | |
| 2003/0227479 A1 | 12/2003 | Mizahi | |
| 2003/0231207 A1 | 12/2003 | Huang | |
| 2004/0088325 A1 | 5/2004 | Elder | |
| 2004/0093281 A1 | 5/2004 | Silverstein | |
| 2004/0122803 A1 | 6/2004 | Dom | |
| 2004/0133480 A1 | 7/2004 | Domes | |
| 2004/0137882 A1 | 7/2004 | Forsyth | |
| 2004/0221224 A1 | 11/2004 | Blattner | |
| 2004/0224703 A1 | 11/2004 | Takaki | |
| 2004/0233471 A1 | 11/2004 | Inoue | |
| 2004/0243424 A1 | 12/2004 | Jeong | |
| 2004/0254928 A1 | 12/2004 | Vronay | |
| 2004/0259630 A1 | 12/2004 | Huard | |
| 2005/0043992 A1 | 2/2005 | Cohagan | |
| 2005/0055272 A1 | 3/2005 | Ryan | |
| 2005/0075889 A1 | 4/2005 | Gomes | |
| 2005/0078804 A1 | 4/2005 | Yomoda | |
| 2005/0080845 A1 | 4/2005 | Gopinath | |
| 2005/0081142 A1 | 4/2005 | Popp | |
| 2005/0086211 A1 | 4/2005 | Mayer | |
| 2005/0097024 A1 | 5/2005 | Rainey | |
| 2005/0102381 A1 | 5/2005 | Jiang | |
| 2005/0125505 A1 | 6/2005 | Kim | |
| 2005/0154639 A1 * | 7/2005 | Zetmeir | G06Q 30/02 |
| | | | 705/14.23 |
| 2005/0159970 A1 | 7/2005 | Buyukkokten | |
| 2005/0193054 A1 | 9/2005 | Wilson | |
| 2005/0222985 A1 | 10/2005 | Buchheit | |
| 2005/0262203 A1 | 11/2005 | Buccheit | |
| 2005/0273344 A1 | 12/2005 | Lee | |
| 2005/0273377 A1 | 12/2005 | Ouimet | |
| 2006/0004619 A1 | 1/2006 | Matheson | |
| 2006/0004703 A1 | 1/2006 | Spivack | |
| 2006/0007372 A1 | 1/2006 | Yuuki | |
| 2006/0042483 A1 * | 3/2006 | Work | G06Q 10/00 |
| | | | 101/91 |
| 2006/0044609 A1 | 3/2006 | Kato | |
| 2006/0047766 A1 | 3/2006 | Spadea, III | |
| 2006/0053194 A1 | 3/2006 | Schneider | |
| 2006/0075044 A1 | 4/2006 | Fox | |
| 2006/0080613 A1 * | 4/2006 | Savant | G06Q 30/06 |
| | | | 715/745 |
| 2006/0089147 A1 | 4/2006 | Beaty | |
| 2006/0098992 A1 | 5/2006 | Yamazaki | |
| 2006/0117264 A1 | 6/2006 | Beaton | |
| 2006/0136498 A1 | 6/2006 | Insley | |
| 2006/0156329 A1 | 7/2006 | Treese | |
| 2006/0168056 A1 | 7/2006 | Gandhi | |
| 2006/0170705 A1 | 8/2006 | Wilson | |
| 2006/0190281 A1 * | 8/2006 | Kott | G06Q 30/02 |
| | | | 709/226 |
| 2006/0200523 A1 | 9/2006 | Tokuda | |
| 2006/0224938 A1 * | 10/2006 | Fikes | G06F 17/30876 |
| | | | 715/234 |
| 2006/0237532 A1 | 10/2006 | Scott-Leikach | |
| 2006/0242139 A1 | 10/2006 | Butterfield | |
| 2006/0245555 A1 | 11/2006 | Makela | |

(56) References Cited

U.S. PATENT DOCUMENTS

| | | | |
|---|---|---|---|
| 2006/0252547 A1 | 11/2006 | Mizrahi | |
| 2006/0253491 A1 | 11/2006 | Gokturk | |
| 2006/0256959 A1 | 11/2006 | Hymes | |
| 2006/0259910 A1 | 11/2006 | Popp | |
| 2006/0265596 A1 | 11/2006 | Nagayama | |
| 2006/0269309 A1 | 11/2006 | Yamazaki | |
| 2006/0282317 A1 | 12/2006 | Rosenberg | |
| 2006/0282426 A1 | 12/2006 | Spears | |
| 2007/0005754 A1 | 1/2007 | Horvitz | |
| 2007/0011186 A1 | 1/2007 | Horner | |
| 2007/0011236 A1 | 1/2007 | Ravula | |
| 2007/0011340 A1 | 1/2007 | Seidl | |
| 2007/0022190 A1 | 1/2007 | Brasegard | |
| 2007/0027931 A1 | 2/2007 | Heckenbach | |
| 2007/0033280 A1 | 2/2007 | Popp | |
| 2007/0067271 A1 | 3/2007 | Lu | |
| 2007/0067392 A1 | 3/2007 | Torres | |
| 2007/0100939 A1 | 5/2007 | Bagley | |
| 2007/0107007 A1 | 5/2007 | Wolcott | |
| 2007/0113241 A1* | 5/2007 | Mai | G06Q 30/02 725/10 |
| 2007/0118461 A1 | 5/2007 | Arkes | |
| 2007/0121843 A1* | 5/2007 | Atazky | H04L 12/588 379/114.13 |
| 2007/0135097 A1 | 6/2007 | Rahkonen | |
| 2007/0136428 A1 | 6/2007 | Boutboul | |
| 2007/0143185 A1* | 6/2007 | Harmon | G06Q 20/045 705/14.16 |
| 2007/0157273 A1 | 7/2007 | McIntyre | |
| 2007/0161382 A1 | 7/2007 | Melinger | |
| 2007/0162569 A1 | 7/2007 | Robinson | |
| 2007/0179792 A1 | 8/2007 | Kramer | |
| 2007/0180039 A1 | 8/2007 | Sutidze | |
| 2007/0184855 A1 | 8/2007 | Klassen | |
| 2007/0209067 A1 | 9/2007 | Fogel | |
| 2007/0219863 A1 | 9/2007 | Park | |
| 2007/0219958 A1 | 9/2007 | Park | |
| 2007/0220092 A1 | 9/2007 | Heitzeberg | |
| 2007/0220128 A1* | 9/2007 | Yang | 709/223 |
| 2007/0233787 A1 | 10/2007 | Pagan | |
| 2007/0240119 A1* | 10/2007 | Ducheneaut | G06Q 10/10 717/124 |
| 2007/0244749 A1 | 10/2007 | Speiser | |
| 2007/0250901 A1 | 10/2007 | McIntire | |
| 2007/0259654 A1 | 11/2007 | Oijer | |
| 2007/0264966 A1 | 11/2007 | Arai | |
| 2007/0296739 A1 | 12/2007 | Lonn | |
| 2008/0005249 A1* | 1/2008 | Hart | G06Q 10/107 709/206 |
| 2008/0010139 A1 | 1/2008 | Elmer | |
| 2008/0030496 A1 | 2/2008 | Lee | |
| 2008/0033739 A1 | 2/2008 | Zuckerberg | |
| 2008/0033941 A1 | 2/2008 | Parrish | |
| 2008/0040370 A1 | 2/2008 | Bosworth | |
| 2008/0049107 A1 | 2/2008 | Hii | |
| 2008/0064374 A1 | 3/2008 | Coffing | |
| 2008/0072157 A1 | 3/2008 | Pally | |
| 2008/0077595 A1 | 3/2008 | Leebow | |
| 2008/0086703 A1 | 4/2008 | Flynt | |
| 2008/0091517 A1 | 4/2008 | Koonce | |
| 2008/0091723 A1 | 4/2008 | Zuckerberg | |
| 2008/0091771 A1* | 4/2008 | Allen et al. | 709/203 |
| 2008/0114737 A1 | 5/2008 | Neely | |
| 2008/0115149 A1 | 5/2008 | Rupp | |
| 2008/0133716 A1* | 6/2008 | Rao | G06Q 30/08 709/220 |
| 2008/0153595 A1* | 6/2008 | Chickering et al. | 463/42 |
| 2008/0162649 A1 | 7/2008 | Lee | |
| 2008/0168497 A1 | 7/2008 | Mitchem | |
| 2008/0183750 A1 | 7/2008 | Lee | |
| 2008/0184133 A1 | 7/2008 | Lee | |
| 2008/0195664 A1 | 8/2008 | Maharajh | |
| 2008/0250332 A1 | 10/2008 | Farrell | |
| 2009/0018903 A1 | 1/2009 | Iyler | |
| 2009/0019370 A1 | 1/2009 | Pally | |
| 2009/0117883 A1 | 5/2009 | Coffing | |
| 2009/0119603 A1 | 5/2009 | Stackpole | |
| 2009/0186699 A9 | 7/2009 | Kelly | |
| 2009/0285506 A1 | 11/2009 | Benson | |
| 2009/0315991 A1 | 12/2009 | Renkis | |
| 2010/0016003 A1 | 1/2010 | Shapiro | |
| 2010/0031341 A1 | 2/2010 | Loh | |
| 2010/0050090 A1 | 2/2010 | Leebow | |
| 2010/0100943 A1 | 4/2010 | Pacholec | |
| 2010/0103277 A1 | 4/2010 | Leebow | |
| 2010/0223341 A1 | 9/2010 | Manolescu | |
| 2010/0235285 A1 | 9/2010 | Hoffberg | |
| 2010/0268783 A1 | 10/2010 | Mizosoe | |
| 2011/0035680 A1 | 2/2011 | Borovoy | |
| 2012/0185538 A1 | 7/2012 | Lee | |

OTHER PUBLICATIONS

SoftComplex Inc., "Tigra Scroller PRO—Demo #1 (Vertical automatic scrolling)", Dec. 31, 2005; http://web.archive.org/web/20051231062850/http://www.softcomplex.com/products/tigra_scroller_pro/demo1.html; 1 page.

"JavaScript Scroller Pro—Demo #1 (Vertical Automatic Scroller)" JavaScript Scroller Pro—Demo #1 (Vertical Automatic Scrolling); Dec. 31, 2005; Web Jan. 9, 2012. <http://web.archive.org/web/20051231062850/http://www.softcomplex/products/tigra_scroller_pro/demo1.html>; 1 page.

International Search Report for PCT/US08/50146 dated May 20, 2008; 3 pages.

Lu, 'Interaction Design Principles for Interactive Television', Masters thesis, submitted to Georgia Institute of Technology, Dept. of Information Design and Technology (online), Published May 2005, (retrieved on Jul. 3, 2008), retrieved from the Internet: http://dm.lcc.gatech.edu/ms_projects/klu/lu_karyn_y_200505_mast.pdf; 219 pages.

International Search Report for PCT/US2008/052029 dated Jul. 16, 2008, 2 pgs.

International Search Report for PCT/US08/74512 dated Jul. 6, 2009; 3 pages.

SoftComplex Inc., "Tigra Scroller PRO—Demo #1 (Vertical automatic scrolling)", Jan. 2, 2012; 1 page; http://www.softcomplex.com/products/tigra_scroller_pro/demo1.html.

Stolowitz Ford Cowger LLP; Listing of Related Cases; Dated Nov. 19, 2013; 2 pages.

* cited by examiner

| Point threshold | Enabled functionality | Title |
|---|---|---|
| 0 | Default functionality | Freshmeat |
| 250 | May enable a basic nickname | Meat |
| 500 | Set custom online status | Cherry |
| 1,000 | Vote on a poll | Cherry Grunt |
| 2,000 | Post comments | Chill Cherry |
| 4,000 | Create polls | Psycho Cherry |
| 6,500 | Download objects uploaded by another | Twisted Cherry |
| 9,000 | Upload 70 photos | Wasted Cherry |
| 14,000 | Leave 750 photo ratings | Black Cherry |
| 25,000 | Set 6,000 friends | Magic Cherry |
| 35,000 | Create a chat room | Cherry Friend |
| 50,000 | Upload 110 photos | Nutty Cherry |
| 75,000 | Set 10,000 friends | Inspired Cherry |
| 100,000 | Upload 140 photos | Ripe Cherry |
| 135,000 | Set 25 family members | Epic Cherry |
| 170,000 | Send up to 8 polls a day | Cherry Idol |
| 210,000 | Upload 170 photos | Cherry Lover |
| 250,000 | Leave 1000 photo ratings | Cherry Pimp |
| 300,000 | Leave 1000 profile ratings | Cherry Assassin |
| 350,000 | Upload 225 photos | Cherry Ninja |
| 425,000 | May enable bold on username | Cherry Rock Star |
| 750,000 | Leave 1,500 profile ratings | Uber Cherry |
| 1,500,000 | Upload up to 1,500 bulletins | Cherry Picker |
| 2,250,000 | Upload 280 photos | Cherry Henchman |
| 3,000,000 | Upload 290 photos | Cherry Insider |
| 6,000,000 | May enable a notorious nickname | Cherry Godfather |

FIG. 8 ically run into each other online. As a result, meeting people and interacting over electronic networks is currently much less desirable than meeting and interacting in person. The disclosure that follows solves this and other problems.

APPARATUS FOR INCREASING SOCIAL INTERACTION OVER AN ELECTRONIC NETWORK

CROSS-REFERENCE TO RELATED APPLICATION

This application is a continuation of U.S. patent application Ser. No. 13/431,649, filed Mar. 27, 2012, which issued on Jan. 7, 2014 as U.S. Pat. No. 8,626,828, which is a continuation of U.S. patent application Ser. No. 11/627,336, filed Jan. 25, 2007, which issued on Apr. 24, 2012 as U.S. Pat. No. 8,166,407, each of which are incorporated by reference herein.

BACKGROUND

People have used email and chat rooms to interact with each other over electronic networks such as the Internet. When people use email for communication, typically they first meet offline, then exchange email addresses and subsequently communicate in a non-real time fashion similar to how people have historically communicated using real mail. When people use chat rooms, they occasionally introduce each other for the first time online and then haphazardly try to find each other in the chat room at the same time to remain in contact.

Although the advance of the Internet and networking technology in general has improved accessibility to email and chat room systems, website design to encourage people meeting and interacting online has remained relatively primitive. That is, these email and chat room systems still rely on people first meeting offline, or haphazardly running into each other online. As a result, meeting people and interacting over electronic networks is currently much less desirable than meeting and interacting in person. The disclosure that follows solves this and other problems.

SUMMARY OF THE INVENTION

In one embodiment, a system includes a server that hosts webpages facilitating user interaction between multiple endpoints. The system monitors for a user input requesting initiation of a happy hour, and when the input is detected, modifies the webpages to alert users of the happy hour. The users are notified of which user initiated the happy hour, and are also notified that interaction incentives accumulate at an increased rate during the happy hour. The system also tracks user scorings that accumulate based on the user interaction, and enables certain website features based on these user scorings. The system also tracks ratings for user-uploaded objects and identifies top rated objects for displaying on webpages viewable by other users.

DESCRIPTION OF EXAMPLE EMBODIMENTS

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device.

Only those parts of the various units are shown and described which are necessary to convey an understanding of the examples to those skilled in the art. Those parts and elements not shown are conventional and known in the art.

Figure 1:
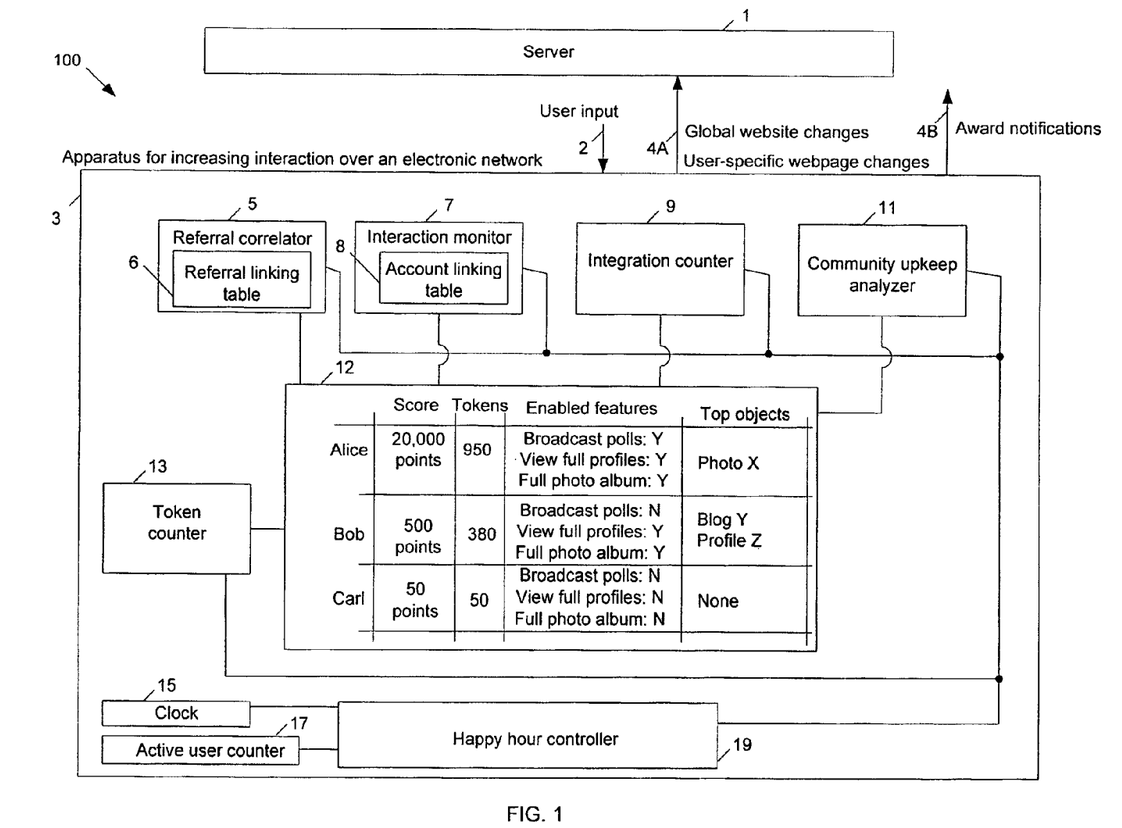
FIG. 1 illustrates an example system for increasing social interaction over an electronic network.

FIG. 1 illustrates an example system for increasing social interaction over an electronic network.

The system 100 includes a server 1 that hosts a domain or website containing webpages for facilitating user interaction. In the present example, the server 1 hosts a website that allows a user to create a personal account for interacting with other account holders connected to the website. The server 1 allows a user to set up a profile over user input 2 describing himself for viewing by other users, to upload a picture to the server 1 for viewing by other users, to view other user profiles and pictures, and to instantly message other users he is interested in meeting. In other examples, the server 1 may be any network device and may host an online auction site, a website for allowing employees of a same company to interact across the globe, a dating website, or any other website containing webpages for facilitating interaction between users over an electronic network.

The apparatus 3 sends communications 4A to the server 1 to control content appearing on the webpages. The communications 4A include global website changes that encourage user logon and interaction during certain peak times (happy hours). The communications 4A also include user-specific webpages changes, such as updates to the user's viewable profile, to photos or other information for enticing interaction from other users. These communications 4A are sent according to user input 2 received when users of the hosted domain send communications from remote endpoints. The apparatus 3 also sends award notifications 4B in response to the user input 2 to further encourage user interaction. Although the present example uses the apparatus 3 for communicating with the server 1, in other examples the functionality of the apparatus 3 may be embodied in software or logic stored on the server 1 or one or more network devices directly connected to the server 1 so that the apparatus 3 may be omitted.

Scoring Users Based on Interaction and Tracking User Object Ratings

The apparatus 3 includes a table 12 for tracking scores for all the users of the domain, as well as for tracking user ratings of objects for all users and for other reasons. With respect to score, the table 12 tracks a current score for each user. The apparatus 3 increases the user's current score whenever an input 2 is detected that, generally speaking, includes user interaction or improves the online community in a way that facilitates socialization amongst users. As will be discussed in greater detail, a user's score is increased when the user refers another member, interacts with other members, takes steps to integrate into the community, or improves the community in some way. As the user's score increases, certain web site features are enabled for the user and the user increases in level. The apparatus 3 provides the user access to newly enabled functionality, for example, by causing a webpage displayed at the user's endpoint to be updated with a graphical interface that allows the user to control the newly enabled functionality. Additionally, the tracked user scorings may also control a title displayed with the username of the user account and the color of a username.

The table 12 also tracks whether the user has a top object such as a top photo, top web log(blog), top profile, top music track, top video, etc. The input 2 provides ratings on objects submitted by the different users, which are tracked in the table 12 so that highest rated objects can be identified according to category. In other words, top objects are not directly affected by the uploading user's score but rather by user ratings for those objects. For example, the user Bob has a much lower score than Alice, but his profile Z is rated higher than Alice's profile. As will be explained later in greater detail, top objects are displayed on homepages (a webpage appearing immediately after user login) for all users thereby increasing interaction opportunities for the user that uploaded the top rated object.

In addition to tracking user scores and object ratings, the table 12 tracks an amount of tokens for each user. Tokens are awarded in many of the same instances as points; however, tokens do not directly control level, enable functionality or color/title changes. Instead, the user may expend the tokens to purchase virtual gifts such as an electronic beer or an electronic cherry for transferring to another user. The user may expend the tokens on services as well, such as exchanging tokens to send out a message that reaches all other users.

The table 12 also tracks enabled features for each user. As the user becomes integrated into the community, and as the user reaches certain levels or point thresholds, additional features are enabled on the user account. For example, Bob and Carl have not reached a point threshold required to enable the broadcast of polls to all other users while Alice has reached the required point threshold. Alice's homepage would thus have a different graphical interface that allows her to send polls, which is not displayed on homepages for Bob and Carl.

The interaction monitor 7 is connected to the table 12 and adjusts point totals according to interactions that involve the user account. For example, the user input 2 can indicate that the user account has been used to initiate interaction with another user account. Initiating interaction with another user account indicates viewing an object such as a profile, photo or blog, commenting on an object on another user account, or messaging another user.

Also, in the present embodiment the interaction monitor 7 increases the point total when the user adds another account as one of his friends, which requires mutual assent and links the accounts in the linking table 8 so that each user is alerted when the other user takes certain actions using the account (for example by changing photo selections). The monitor 7 may also assign points when the account is added as a fan of another account. Joining as a fan of another account does not require consent from the other account holder and causes the joined account to be alerted when the other account takes certain actions such as changing photo selections, but does not trigger alerts in the other direction. The monitor 7 may also assign points when the user account is added as a family member of another account, which is similar to a friend link but allows mutual blocking. Mutual blocking occurs when one account selects an option to block any communications from a targeted user and all family members to the account are also automatically blocked from receiving communications from the targeted user.

Similarly, the interaction monitor 7 adjusts point totals for a monitored account when other accounts initiate interaction with the monitored account. Accordingly, a score on the monitored account may be increased whenever another account is used to view an object on the account, comment on a blog on the account, or message the account. The monitor 7 also assigns points when another account adds the account as a friend, fan or family member.

In addition to the above, the interaction monitor 7 in combination with the table 12 also tracks object ratings for updating the table 12 with top objects. For example, when Alice uses her account to rate Bob's profile Z, the monitor 7 tracks this rating and combines it with other ratings from other users. In the present embodiment, the frequency of the rating, the average rating and the total number of ratings are used to identify top objects for every twenty-four hour period, which are identified in the table 12. In other embodiments, ratings may even be weighted based on the rater's score so that a rating from a higher scorer, such as Alice, affects the average rating of Bob's profile Z more than a rating from a lower scorer such as Carl. In the present embodiment, users may rate objects using a rating range of one to ten, with ratings of eleven enabled for either high scoring users or users that paid a premium joining fee. Other rating ranges may be used in other embodiments.

The apparatus 3 also includes a referral correlator 5 that adjusts point totals stored in the table 12 according to whether the user account refers a new account. When a user such as Alice triggers an invitation to a new user such as Darcy, the correlator assigns Alice a point bonus based on the referral. Additionally, the correlator 5 links Alice and Darcy in the linking table 6 so that referrals by Darcy can be correlated to Alice as well. This allows the correlator 6 to assign additional point awards to Alice whenever Darcy (or even one of Darcy's referrals) refers another user. Also, the entries in the table 6 can be used so that whenever Darcy (or one of her referrals) obtains a point award for any reason, Alice may be assigned a small, predetermined ratio of that point award, for example one percent.

The apparatus 3 also includes an integration counter 9 for improving integration of new users into the website community. The counter 9 identifies when a new user meets certain integration criteria, such as posting a primary photo of themselves in their profile. Whenever one of these criteria is met, the counter 9 communicates with the table 12 to denote either a point award, a token award, or to indicate a new functionality to be enabled. For example, when Carl posts a primary photo, the counter 9 may signal the table 12 to indicate that Carl's account should be denoted as enabled to view full profiles of other members. As a result, after uploading the primary photo and thus becoming more integrated into the community, a webpage displayed at Carl's endpoint indicates that Carl may view full profiles of other users. Alternatively, the counter 9 may communicate with the table 12 to remove a maximum point total ceiling for Carl when Carl posts a primary photo or performs some other interaction criteria. In other words, Carl may be limited from exceeding a certain point maximum no matter how many interactions he performs until Carl uploads a primary photo.

The counter 9 also causes the apparatus 3 to send communications 4A that include global website changes. For example, when a new user such as Darcy joins the community, the apparatus 3 signals the server 1 to modify every webpage on the website to identify Darcy as a new user. In one example, every webpage or every user homepage includes a scrolling bar that scrolls profiles of new users such as Darcy for viewing by every other member.

The apparatus 3 also includes a community upkeep analyzer 11 that modifies scores marked in the table 12 whenever one of the accounts are used to upkeep the community. For example, the analyzer 11 in one embodiment assigns an award to Alice's account when that account reports that another user has inappropriately uploaded an object. Inappropriateness may be determined based on an appropriateness policy displayed on one or more of the webpages. This appropriateness policy designates three types of objects in this example, a first type that is appropriate for viewing at a typical workplace, a second type that may be uploaded but must be flagged as not appropriate for viewing at a typical workplace, and a third type that is not appropriate for the website regardless of flagging. Thus, the analyzer 11 may award Alice points for identifying a third type of object that must be removed or a second type of object that is not flagged, and each of these actions may elicit different point awards. The analyzer 11 may also remove points or prevent Alice from gaining any additional points for a predetermined amount of time when the report is identified as a false report.

In other embodiments, the analyzer 11 may also automatically change a point total for the user account that uploaded the inappropriate object. For example, when a user uploads an object that is later determined to be inappropriate, any points awarded to the user for the uploaded object may be automatically retracted or a larger point penalty may be applied.

In yet other embodiments, the table 12 may list a very high scoring user account as enabled for board monitoring so that one of the scored users may control removal of objects or text that is inappropriate according to the appropriateness policy. When such a user removes inappropriate objects or text, the analyzer 11 user award a point bounty to the user's account.

Happy Hour

The apparatus 3 also includes a happy hour controller 19 for controlling happy hour in response to a user input 2. One function performed by the controller 19 is triggering website changes using the communications 4A sent to the server 1. These global website changes promote user activity during the happy hour period and provide recognition for the user that initiated the happy hour (who may have paid a fee or expended tokens to initiate the happy hour using input 2). Another function of the controller 19 is triggering a change in point and token assignment rates during the happy hour by communicating with the server 1. Yet another function of the initiator is indicating and implementing discounts on token or cash purchasable items during the happy hour by modifying the website using the communications 4A. Each of these functions will be explained in greater detail in turn.

Figure 2A:
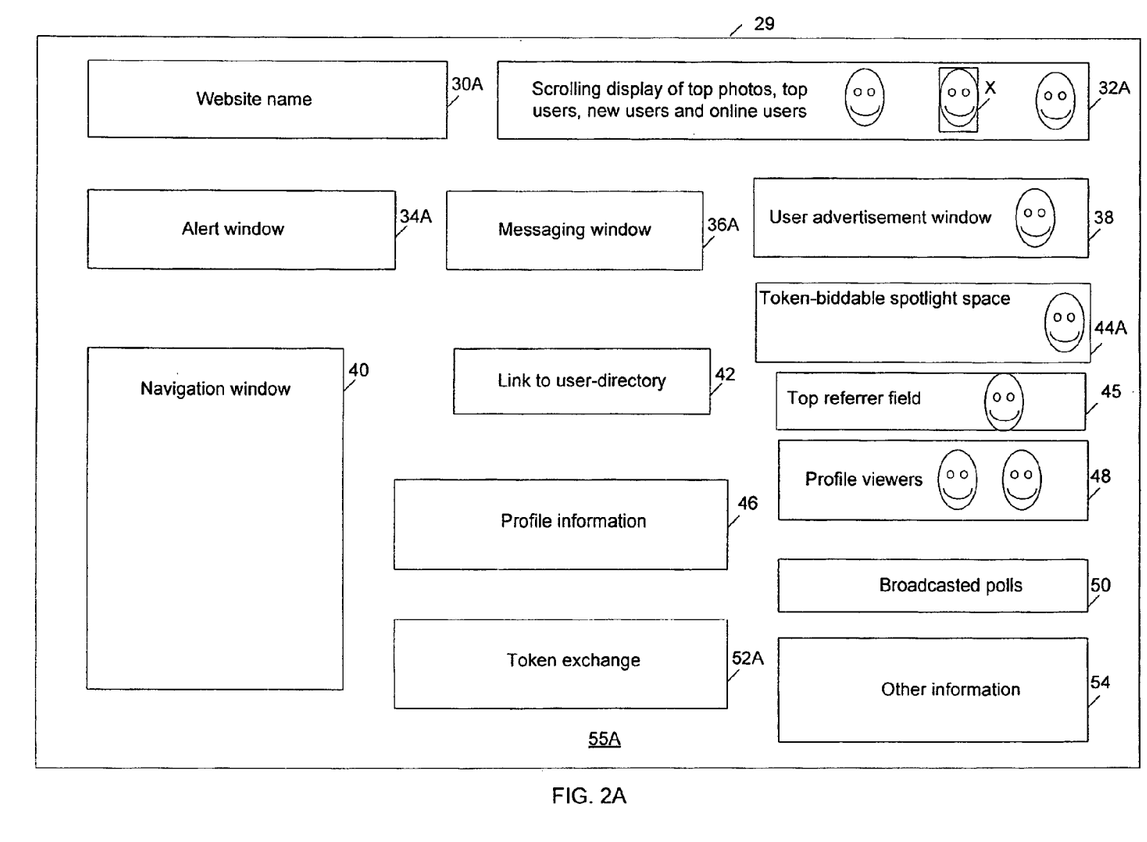
FIG. 2A illustrates a webpage displayed to all members and controlled by the apparatus illustrated in FIG. 1.
Figure 2B:
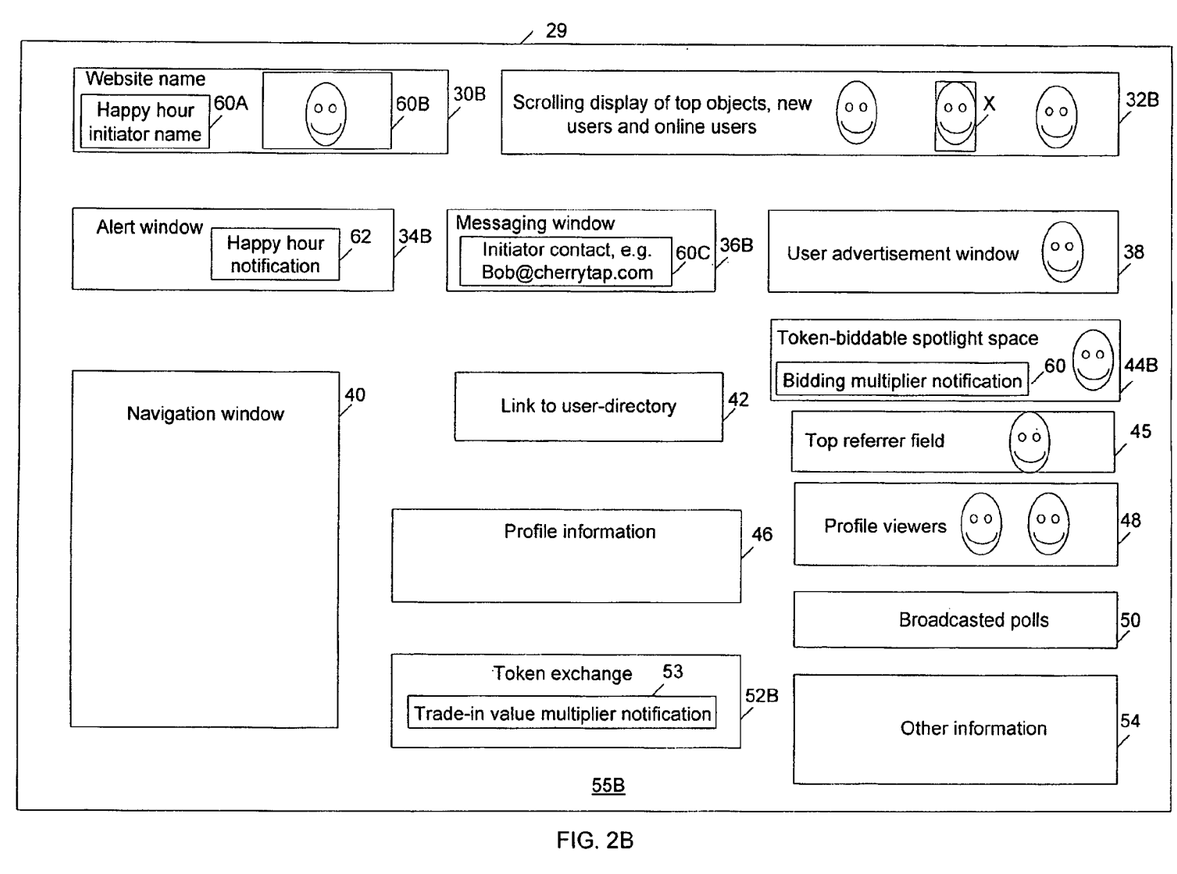
FIG. 2B illustrates how a user-initiated happy hour period alters the webpage that is illustrated in FIG. 2A.

The functioning of the controller 19 to control webpage changes is illustrated by way of FIGS. 2A and 2B, which show the global website changes occurring during the happy hour. FIG. 2A shows the homepage 29 before happy hour is initiated, while FIG. 2B shows the page 29 after happy hour is initiated.

Referring to FIG. 2A, an example of a user homepage 29 hosted by the server 1 (FIG. 1) is shown. The user homepage 29 includes a website name 30A. The page 29 also includes a scrolling display 32A for displaying top objects such as top rated photo X indicated in the table 12 (FIG. 1), photos of new users and photos of currently online users.

The page 29 also displays an alert window 34A that provides various indications about website operation as well as award notifications and indications of activity by other users. The page also includes a messaging window 36A that displays links to other users such as those linked in table 8 (FIG. 1). The page 29 also includes a user advertisement window 38 that displays messages that are sent from one user to all other users. For example, one user may expend tokens or pay money to have his message and photo sent to all website users for display in window 38.

The page 29 also includes a link 42 to a user-directory, which displays photos and names of every site member. The page 29 includes a token-biddable spotlight space 44A, which spotlights a user's profile and photo for a predetermined amount of time when a user wins an auction using tokens or money. The page 29 also includes a top referrers field 45 that identifies top referrers identified by the correlator 5 (FIG. 1).

The page 29 also includes profile information 46 that allows a user to view and edit his active profile. Other user objects may be uploaded or changed using the navigation window 40.

The page 29 also includes a field 48 showing photos of members that have recently viewed the user's profile included in field 46. Thus, the user is able to identify other members that viewed his profile and that may be interested in communicating with him. A field 50 shows polls that are broadcasted by users having a score sufficient to enable polling functionality as indicated by table 12 (FIG. 1).

A portion 52A organizes links to expend tokens or money, such as by purchasing virtual beers, initiating happy hours, purchasing user advertisements in the window 38, etc. Another window 54 provides various other information such as links to flash games, links to online lounges or chat rooms that may be formed and controlled by high scoring users, links to audio or video segments uploaded by other users, etc.

Referring now to FIG. 2B, upon initiation of the happy hour the apparatus 3 communicates with the server 1 to make several changes to the user homepage 29, as well as other pages on the site. For instance, in the present embodiment the name 60A of the user that purchased the happy hour with tokens or money and a visual representation 60B of the user is included in the updated website name field 30B. The visual representation 60B may include a photo, video clip, animated image, etc. of the user or selected by the user for representing himself. This change is preferably included on the user homepage 29 as well every other page on the website to acknowledge the user that initiated the happy hour. Additionally, during happy hour contact information 60C for the user is included in the updated messaging window 36B for every user's homepage regardless of whether those other users have identified the triggering user as a friend or fan, or have even previously interacted with the triggering user. As a result, these other users are only one click away from typing a message that thanks the triggering user.

Other changes are made to notify all users that the happy hour has been initiated. Accordingly, other portions such as 34B, 44B and 52B are updated with notifications such as 62, 60 and 53 indicating that happy hour is active and/or that discounts or point/bidding multipliers are currently being applied. Additionally, the background color for the website may change from color 55A (FIG. 2A) to color 55B (FIG. 2B). Also, the scrolling display 32B scrolls at a faster rate during the happy hour, for example twice as fast. A background color for the scrolling display 32B may also change.

The homepage 29 illustrates several of the display portions including photos. In other embodiments, any visual representation of a user may be substituted for these photos including a video clip, an animated image, etc.

Referring back to FIG. 1, in addition to causing changes to some or all of the webpages hosted by the server 1, the controller 19 also triggers a change in point and token assignment rates during the happy hour to incentivize user activity for increased socialization during the happy hour. For example, the controller 19 signals the correlator 5 to increase referral point awards for referrals occurring during the happy hour. Similarly, the controller 19 signals the interaction monitor 7 to multiply points assigned in the table 12 for interaction occurring during the happy hour. Point assignments may be doubled or increased by some other predetermined rate during the happy hour. The predetermined rate may be dynamic based on the time of day (e.g. happy hours in the early morning may multiply point assignments less than happy hours occurring closer to typical work hours). The predetermined rate may be selected based on empirical analysis of how much of a rate increase is needed to cause a certain amount of users to login during the happy hour based on a current total subscription number. Similarly, the counter 9 and the analyzer 11 are also signaled so that any corresponding point or token assignments may also be increased.

Another function of the happy hour controller 19 is to initiate discounts during happy hour. For example, the controller 19 may signal the token counter 13 to apply a discount before adjusting remaining tokens amounts in response to purchases occurring on the website. The signaling of the token counter 13 or the changes to the webpages hosted by the server 1 can thus provide discounts for all items sold on the website. The discounts may vary based on whether an item is purchased with money or tokens, and the discounts may vary based on the time of day and the amount of active users during the happy hour. Thus, in other embodiments where the website represents an electronic store, a single user may pay a fee to initiate a discount period where discounts become available to all users of the website. In such an example, the "single user" may be a company that is funding the discount in exchange for advertising provided by the website to all member users during the happy hour.

The happy hour controller 19 may interface with the clock 15 and the active user counter 17 so that the price for initiating a happy hour depends both on time of day and an amount of active users. Alternatively, the happy hour price may remain constant but the length of the happy hour may change depending on time of day or an amount of active users. A happy hour duration may be one hour, or any amount of time, e.g. ten minutes or ninety minutes, etc. The cost to initiate a happy hour may be predetermined and fixed, or selected according to an auction so that a highest bidding user during a certain time period is the user initiating happy hour for his bid amount.

The term happy hour encompasses all temporary time periods usable for socializing. For example, the term happy hour encompasses a birthday mode whereby a user pays a certain amount of money or tokens to put the site into birthday mode. The graphics displayed on the webpages may change to alert members that there is a birthday, and the incentive rates and discounts may all be implemented. The same site may have multiple different types of happy hours, e.g. a first type to celebrate the end of a work day, the second type to celebrate a birthday, the third type to celebrate the birth of a new child, etc. Each of these different types may have different incentive rate changes and different discount amounts, and may trigger theme changes for the website layout (balloon images for birthday mode, stork images for new child celebration mode, etc.). The term happy hour also encompasses coffee breaks, siestas, tea time, graduation celebrations, etc. In one example, the website automatically triggers a happy hour during super bowl halftimes or during breaks occurring between other major sporting events.

The happy hour may represent any time related event that is not triggered by a user input but rather triggered by a certain time occurring. For example, the apparatus 3 may include a database that lists the birthdays of every website member in an internal table. Whenever one of these birthdates occurs, the apparatus 3 is automatically triggered to initiate the happy hour. The member whose birthday triggered the happy hour is recognized in a similar manner as a member sending a happy hour trigger.

The temporary time periods can be established to correspond with any arbitrary event, for any arbitrary length of time, at any arbitrary time of day. The temporary time periods may give any arbitrary point allocation scheme, e.g. double interaction incentives, triple interaction incentives, an interaction incentive that is based on how much an advertiser pays to initiate the temporary time period, etc. Similarly any discounts based on token or money price listings may be any arbitrary amount and may be based on how much an advertiser pays to initiate the temporary time period.

Figure 3:
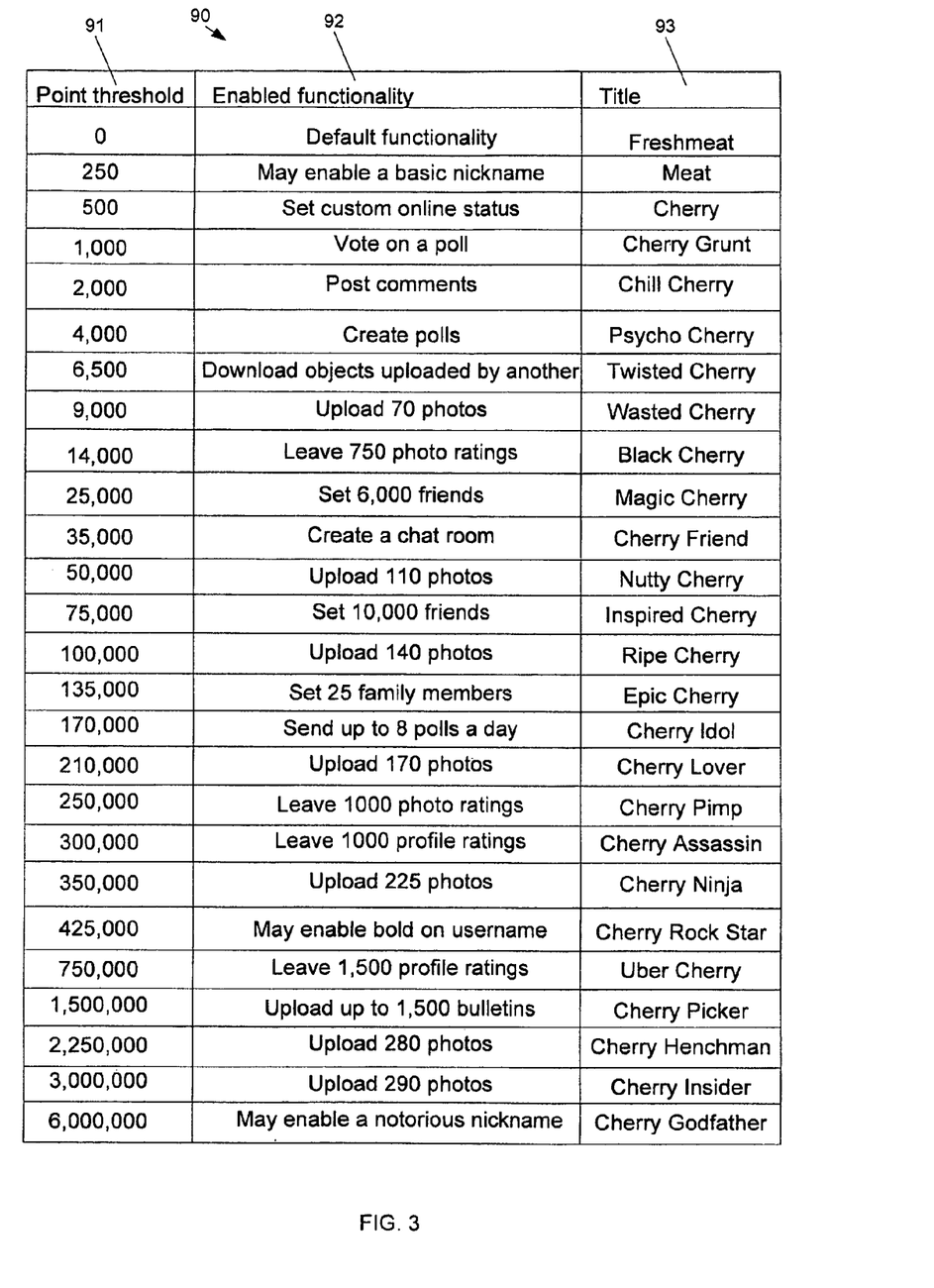
FIG. 3 illustrates example functionality that may be enabled on a user account when the user account reaches certain point thresholds.

FIG. 3 illustrates example functionality that may be enabled on a user account when the user account reaches certain point thresholds.

Referring to FIG. 3, other functionality besides the polling functionality can be enabled for a user when that user reaches a certain point threshold. The table 90 denotes a point threshold field 91 indicating a point threshold both for enabling a website function listed in field 92 and for earning a username title listed in field 93. In other words, scores for each of the users from table 12 (FIG. 1) are compared to the table 90 for determining when to update the enabled features column in the table 12 (FIG. 1).

For example, referring to FIG. 3 when a user account reaches five hundred points the enabled features field in the table 12 (FIG. 1) is updated to enable the custom online status feature for that user account. This functionality allows a corresponding user to set a custom online status that indicates, to other users, the user's current status expressed in terms selected by the user. In other words, a user reaching five hundred points can set a user-entered custom online status such as "working at the coal mine," instead of system-provided default status indicators such as "online", "busy", "away", "offline", etc.

Referring still to FIG. 3, when the user account reaches one thousand points, the user account may vote on a poll sent out by another user even though the user cannot yet broadcast polls himself. At four thousand points the user account is enabled with full polling functionality so that the user can himself sends polls to other members.

When the user account reaches two thousand points, the user may post comments below another member's blog, e.g. HyperText Markup Language (HTML) comments. Comment functionality may also unlock the ability to post comments corresponding to any other member object such as a member photo or profile.

When the user account reaches six thousand five hundred points, the user may be enabled to download or "rip" an object posted by another user. For example, when another user posts an object such as a photo, the photo is uploaded to the server. A user for an account having six thousand five hundred points or more can then download that photo from the server to the user's machine for viewing offline, locally modifying, posting himself, etc.

When the user account reaches thirty five thousand points, the user account can be used to create a chat room. The user creating the chat room has certain management functions such as having the ability to invite members to the chat room, to expel a current chat room participant, to temporarily censor a chat room participant, etc.

When the user account reaches one million, five hundred thousand the account is enabled for posting bulletins. The user account enabled with bulletins can be used to post bulletins, which are permanent messages linked on window 54 (FIG. 2) or another window on the user homepages.

The amount of photos or other objects a user may have posted at any one time increases at various point thresholds as shown in FIG. 3. This feature prevents new users that have not proven an ongoing interest in the community from using a disproportionate amount of uploading space on a server that hosts the website. Similarly, a user account can have six thousand friends linked to it at any given time instead of some lower default amount when the user account reaches twenty five thousand points. Other thresholds are shown for extending a default limit on an amount of object ratings and for extending a default limit on an amount of family members.

Reaching other point thresholds unlocks various other functionality, such as allowing the user account to show a nickname that connotes more experience within the community than a default nickname enabled on an account, e.g. unlocking the nickname "meat." Reaching point thresholds may also change titles from a default title such as "freshmeat" to other titles that denote a great deal of investment in the community (e.g. "cherry godfather").

These enabled functionalities shown in FIG. 3 are only some of the types of functions that can be enabled for an account reaching a particular score threshold. Other examples include allowing only high scoring user accounts to view objects that have been tagged as inappropriate for viewing at work (or some other environment) according to an appropriateness policy displayed on the website. Other examples include enabling a user account to view or access an entire category of objects (e.g. all photos or all profiles) only when a certain score threshold is reached. Thus, any functionality can be enabled according to a score threshold. Generally, functionality that allows a user to have wider interaction capability within the online community requires higher scores, which prevents users that have not been vetted through experience from heavily influencing (and potentially maliciously disrupting) the community and the webpages with obscene or otherwise undesirable communications.

In yet other examples, a particular functionality may be enabled only after a user account reaches a particular score threshold and the user account performs some other predefined interaction criteria. For example, a user account may be allowed to bold the username only after reaching a score of four hundred and twenty five thousand and uploading a primary photo that is authenticated as an actual depiction of the user's face. In other embodiments, any of the functionally shown in FIG. 3 may be enabled when a user completes some predefined interaction criteria and regardless of the user's score.

Also, the actual score thresholds for enabling functionality may vary from what is shown in FIG. 3. Moreover, in other examples, fixed scored thresholds are not required. Instead, particular website functionality may be enabled only for the top ten highest scoring user accounts, or enabled for all user accounts having a score above a median score.

The titles listed in the field 93 may be automatically applied to a username when the user account reaches a new point threshold indicated in the field 91. Any titles may be used, but the titles should be selected to connote more experience and time investment in the community for users having higher scores.

Figure 4:
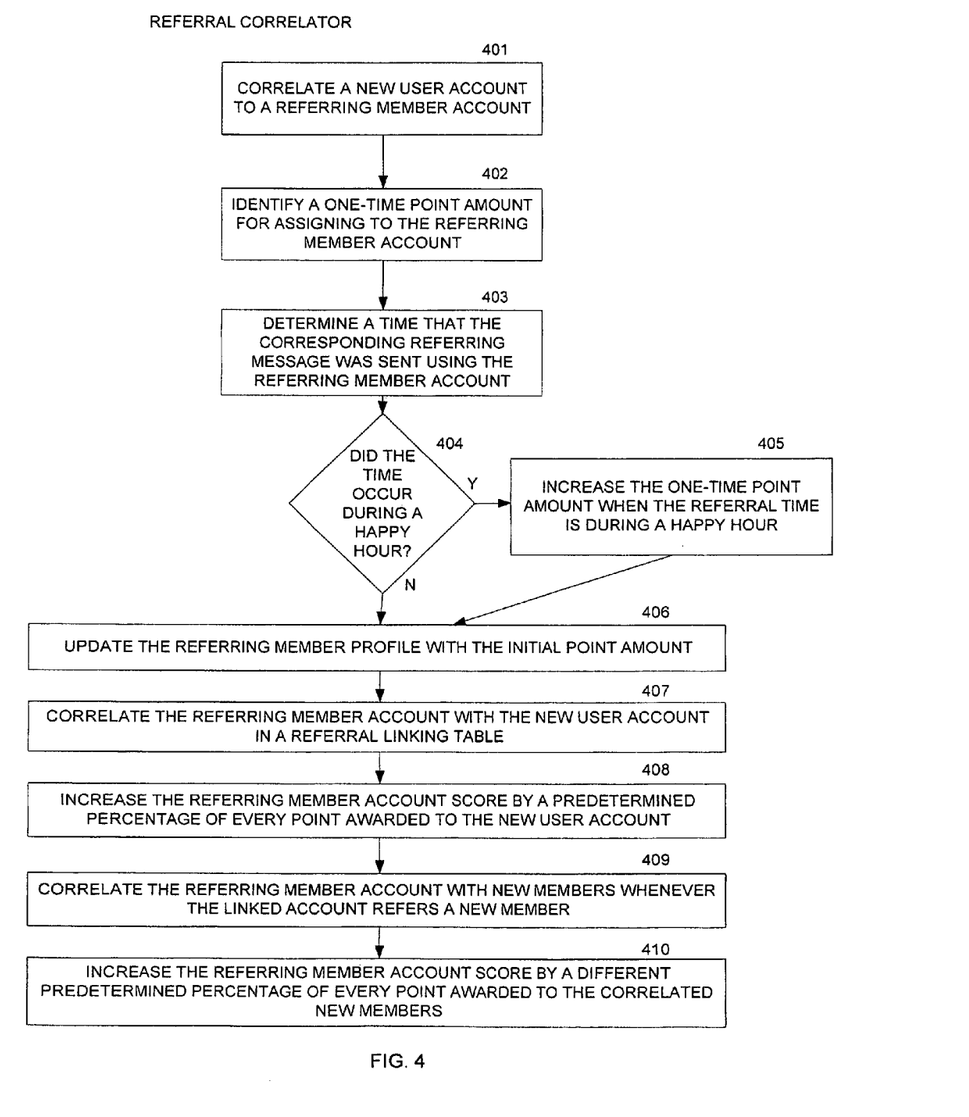
FIG. 4 illustrates an example method for using the referral correlator included in the apparatus illustrated in FIG. 1.

FIG. 4 illustrates an example method for using the referral correlator included in the apparatus illustrated in FIG. 1.

In block 401, a new user account is correlated to a referring member account. In block 402, the correlator 5 identifies a one-time point amount for assigning to the referring member account. The correlator 5 then determines a time that a corresponding referring message that solicited the referral was sent using the referring member account in block 403. In block 404, the correlator 5 determines whether the time occurred during a happy hour. When the time did occur during the happy hour, the one-time point amount is increased in block 405. In block 406, the correlator 5 updates the referring member profile with the initial point amount.

In block 407, the correlator 5 correlates the referring member account with new user account in a referral-linking table. The referring member account score is increased by a predetermined percentage of every point awarded to the new user account in block 408.

In block 409, the referring member account is correlated with new members whenever the linked new account refers a new member. In block 410, the correlator 5 increases the referring member account score by a different predetermined percentage of every point awarded to the correlated new members.

Figure 5:
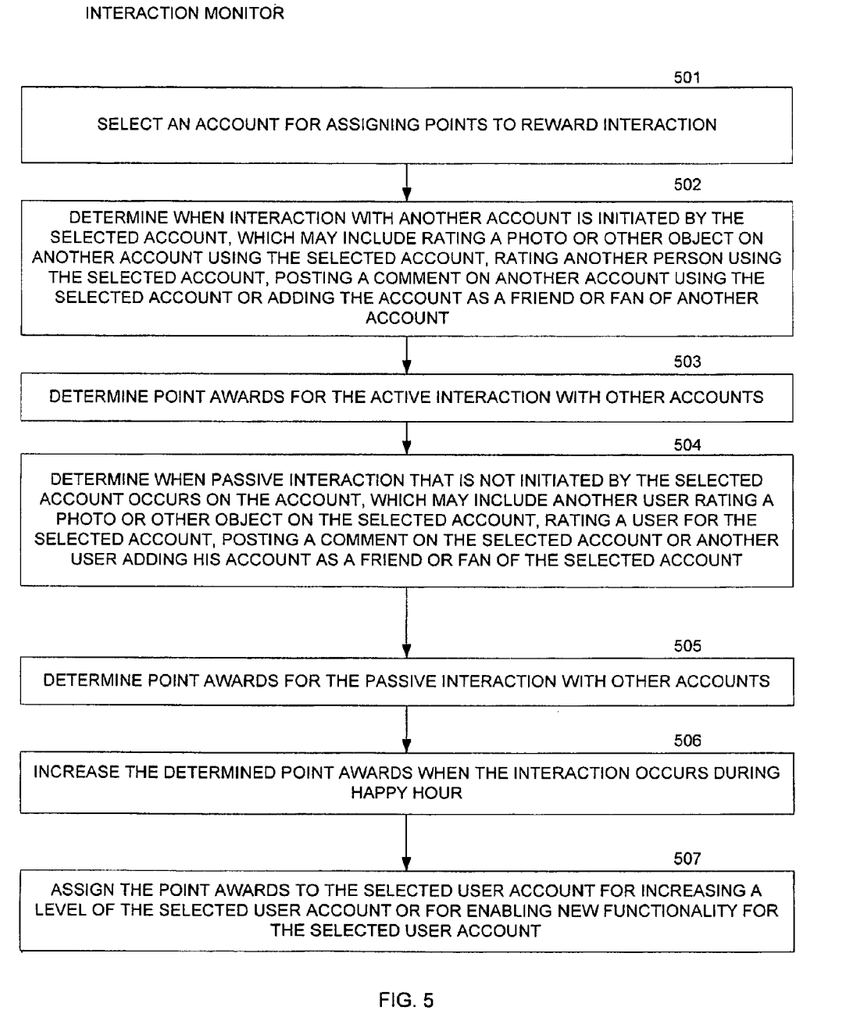
FIG. 5 illustrates an example method for using the interaction monitor included in the apparatus illustrated in FIG. 1.

FIG. 5 illustrates an example method for using the interaction monitor included in the apparatus illustrated in FIG. 1.

In block 501, the monitor 7 selects an account for assigning points to reward interaction. Typically, every account is monitored so this and the following blocks are repeated for every account. The monitor 7 determines when interaction with another account is initiated by the selected account in block 502, which may include rating a photo or other object on another account using the selected account, rating another person using the selected account, posting a comment on another account using the selected account or adding the account as a friend or fan of another account. In block 503, the monitor 7 determines point awards for the active interaction with other accounts.

In block 504, the monitor 7 determines when passive interaction that is not initiated by the selected account occurs on the account, which may include another user rating a photo or other object on the selected account, another user viewing an object on the account, rating a user for the selected account, posting a comment on the selected account or another user adding his account as a friend or fan of the selected account. In block 505, the monitor 7 determines point awards for the passive interaction with other accounts.

In block 506, the monitor 7 increases the determined point awards when the interaction occurs during happy hour. The monitor 7 assigns the point awards to the selected user account in block 507, which may increase an assigned level and/or enable new functionality for the user account.

Figure 6:
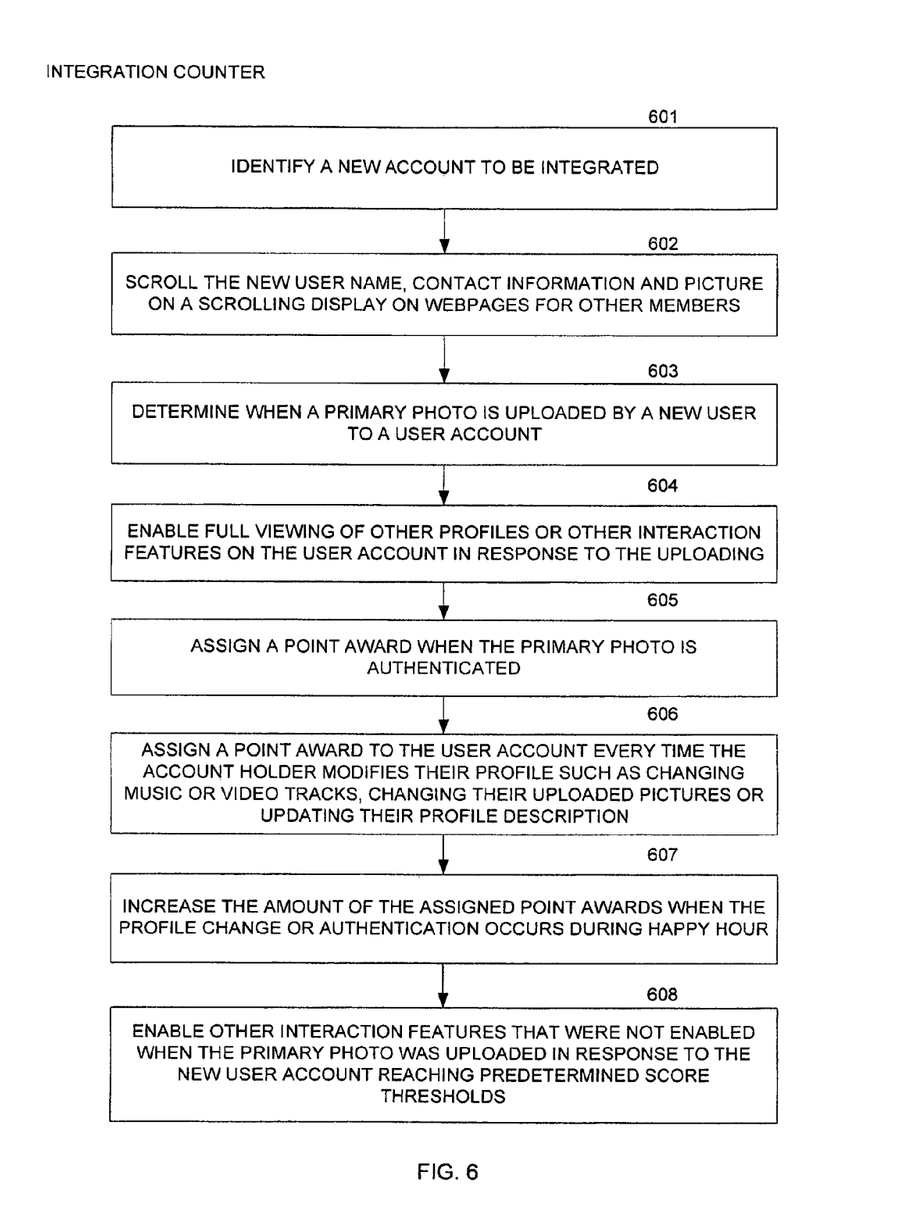
FIG. 6 illustrates an example method for using the integration counter included in the apparatus illustrated in FIG. 1.

FIG. 6 illustrates an example method for using the integration counter included in the apparatus illustrated in FIG. 1.

In block 601, the counter 9 identifies a new account to be integrated. The counter 9 causes the new user name, contact information and picture to be displayed on webpages for other members in block 602.

In block 603, the counter 9 determines when a primary photo is uploaded by the new user to the new account. The counter 9 enables full viewing of other profiles or other interaction features on the user account in response to the uploading in block 604. In block 605, the counter 9 assigns an additional point award when the primary photo is authenticated. In other words, when the user verifies that the primary photo is actually a picture of their face, a point award is assigned.

In block 606, the counter 9 assigns a point award when the new user completes their profile and every time thereafter the profile is updated. Profile modification includes changing music or video tracks, changing uploaded pictures or updating a profile description. In block 607, the assigned point awards are increased when the profile change or authentication occurs during happy hour. In block 608, the counter 9 enables other interaction features as the new account reaches predetermined point thresholds.

Figure 7:
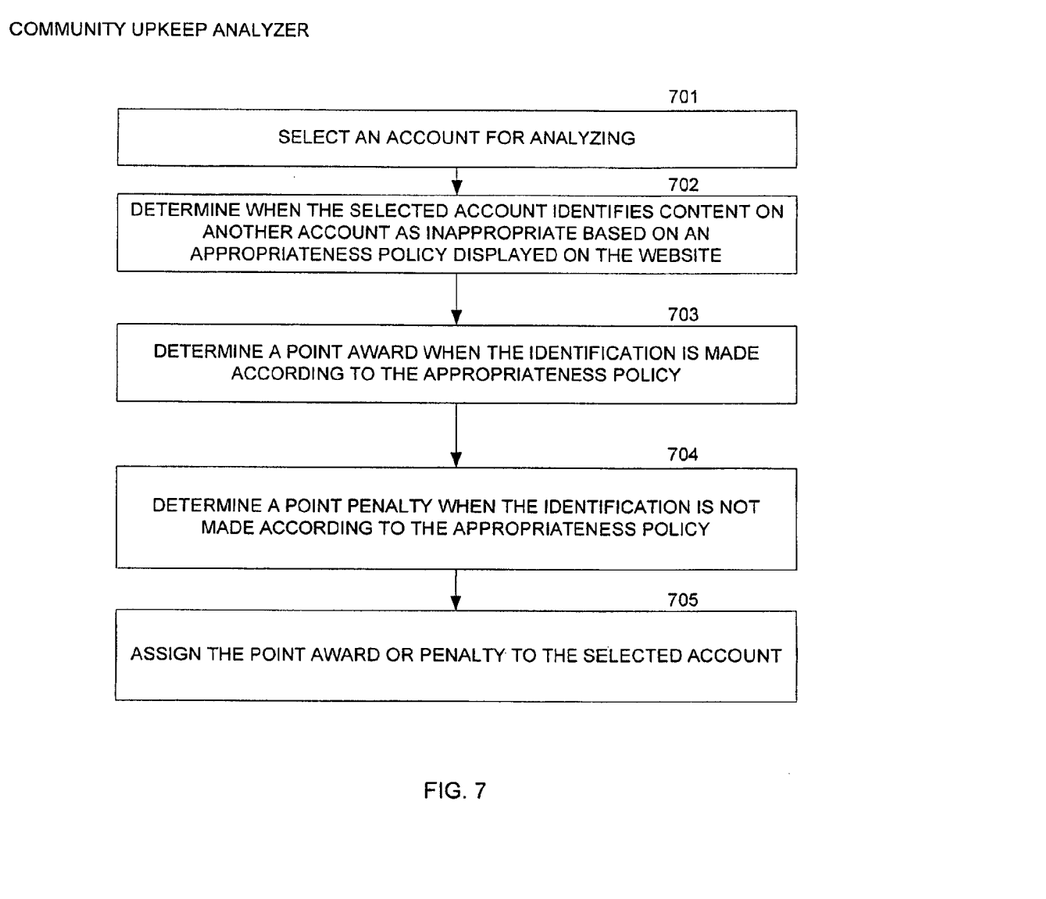
FIG. 7 illustrates an example method for using the community upkeep analyzer included in the apparatus illustrated in FIG. 1.

FIG. 7 illustrates an example method for using the community upkeep analyzer included in the apparatus illustrated in FIG. 1.

In block 701, the analyzer 11 selects an account for analyzing. Typically, all accounts are analyzed at the same time. The analyzer 11 determines when the selected account identifies content on another user account as inappropriate for the community in block 702. In block 703, the analyzer 11 assigns a point award when there is a determination that the identification is made according to an appropriateness policy. The determination may be, for example, inputted by a site administrator that may not be a scored user. In block 704, the analyzer assigns a penalty when there is a determination that the identification is not made according to the policy. In block 705, the analyzer 11 assigns the point award or penalty to the selected account.

Figure 8:
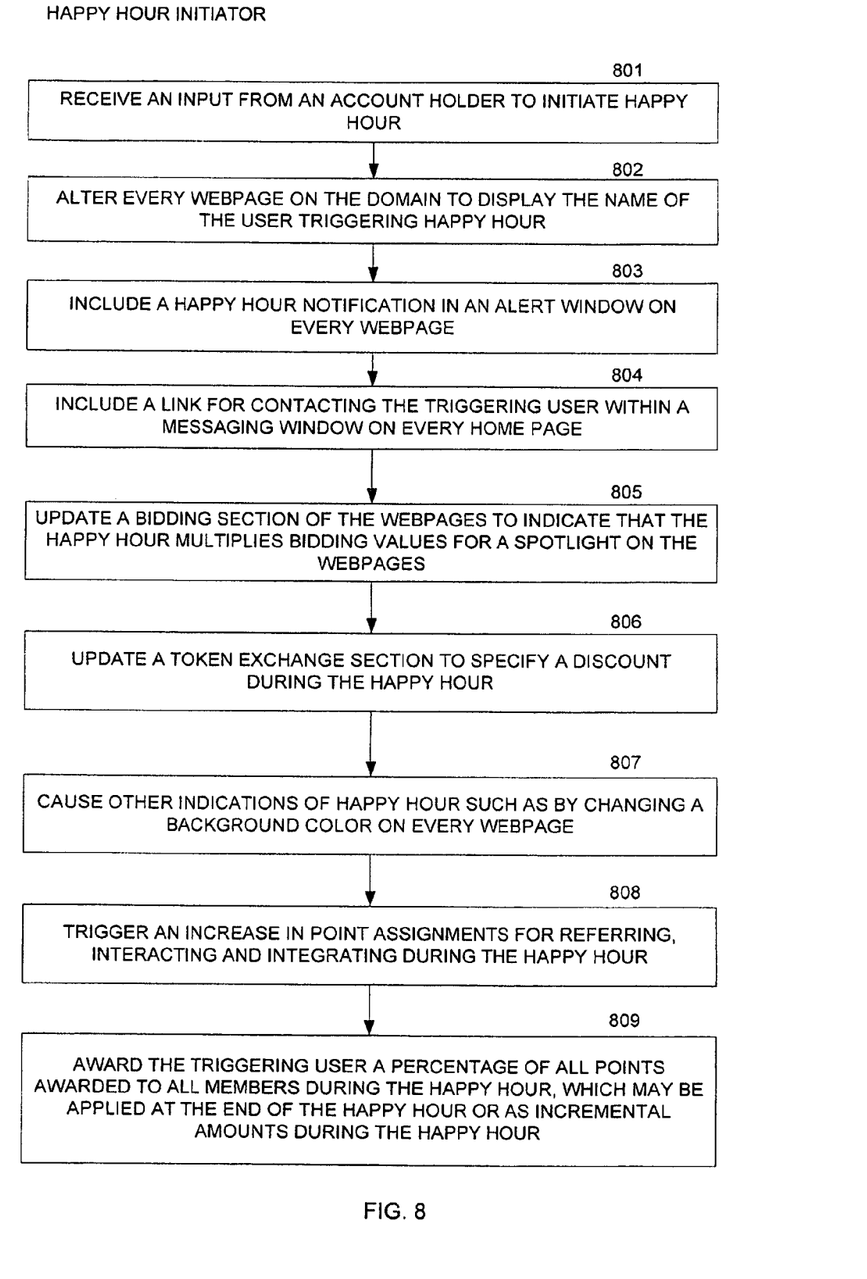
FIG. 8 illustrates an example method for using the happy hour initiator included in the apparatus illustrated in FIG. 1.

FIG. 8 illustrates an example method for using the happy hour initiator included in the apparatus illustrated in FIG. 1.

In block 801, the initiator 19 receives an input from an account holder to initiate happy hour. The initiator 19 alters every webpage on the domain to display the name of the user triggering the happy hour in block 802. In block 803, the initiator 19 includes a happy hour notification in an alert window on every webpage. In block 804, the initiator 19 includes a link for contacting the triggering user within a messaging window on every homepage.

In block 805, the initiator 19 updates a bidding section of the webpages to indicate that the happy hour multiplies bidding values for a spotlight on the webpages. In block 806, the initiator 19 updates a token exchange section to specify a trade-in multiplier or discount during the happy hour. The initiator 19 may cause other indications of happy hour such as changing a background color on every webpage in block 807. In block 808, the initiator 19 triggers an increase in point assignments for referring, for interacting and for integrating during the happy hour. In block 809, the initiator 19 awards the triggering user a percentage of all points distributed to all members during the happy hour, which may be applied at the end of the happy hour or as incremental amounts throughout the happy hour.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown are conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A memory device having instructions stored thereon that, in response to execution by a processing device, cause the processing device to perform operations comprising:
   associating a set of member actions of an electronic social networking system with an account corresponding to a member of the electronic social networking system;
   wherein a subset of the associated set of member actions includes member actions to be unlocked;
   incrementing a score for the account in response to the member effecting member-to-member interaction through the electronic social networking system;
   wherein the electronic social networking system comprises a social networking resource that is configured to provide real time interaction between the member and other members;

gradually unlocking, for the account, the member actions of the subset based on the score, wherein a first member action of the subset is unlocked in response to the score reaching a first threshold and a second different member action of the subset is unlocked in response to the score reaching a second different threshold; and updating a remote device that is associated with the account with graphical user interfaces, each graphical user interface to enable a corresponding one of the member actions of the subset that are gradually unlocked.

2. The memory device of claim 1, wherein the member actions of the subset include broadcasting of messaging using the electronic social networking system.

3. The memory device of claim 1, wherein incrementing the score for the account in response to the member effecting member-to-member interaction through the electronic social networking system further comprises incrementing the score for the account in response to utilization of the member account to initiate the member-to-member interaction through the electronic social networking system.

4. A method, comprising:

associating a set of member actions of an electronic social networking system with an account corresponding to a member of the electronic social networking system;

wherein a subset of the associated set of member actions includes member actions to be unlocked;

incrementing a score for the account in response to the member effecting member-to-member interaction through the electronic social networking system;

wherein the electronic social networking system comprises a social networking resource that is configured to provide real time interaction between the member and other members;

gradually unlocking, for the account, the member actions of the subset based on the score, wherein a first member action of the subset is unlocked in response to the score reaching a first threshold and a second different member action of the subset is unlocked in response to the score reaching a second different threshold; and updating a remote device that is associated with the account with graphical user interfaces, each graphical user interface to enable a corresponding one of the member actions of the subset that are gradually unlocked.

5. The method of claim 4, wherein the member actions of the subset include broadcasting of messaging using the electronic social networking system.

6. The method of claim 4, wherein incrementing the score for the account in response to the member effecting member-to-member interaction through the electronic social networking system further comprises incrementing the score for the account in response to utilization of the member account to initiate the member-to-member interaction through the electronic social networking system.

7. An apparatus, comprising:

an electronic device configured to:

associate a set of member actions of an electronic social networking system with an account corresponding to a member of the electronic social networking system;

wherein a subset of the associated set of member actions includes member actions to be unlocked;

increment a score for the account in response to the member effecting a member-to-member interaction through the electronic social networking system;

wherein the electronic social networking system comprises a social networking resource that is configured to provide real time interaction between the member and other members;

gradually unlock, for the account, the member actions of the subset based on the score, wherein a first member action of the subset is unlocked in response to the score reaching a first threshold and a second different member action of the subset is unlocked in response to the score reaching a second different threshold; and update a remote device that is associated with the account with graphical user interfaces, each graphical user interface to enable a corresponding one of the member actions of the subset that are gradually unlocked.

8. The apparatus of claim 7, wherein the member actions of the subset comprise poll broadcasting.

9. The apparatus of claim 7, wherein the member actions of the subset comprise poll voting.

10. The apparatus of claim 7, wherein increment the score for the account in response to the member effecting member-to-member interaction through the electronic social networking system further comprises increment the score for the account in response to utilization of the member account to initiate the member-to-member interaction through the electronic social networking system.

* * * * *